Jan. 31, 1928.

E. G. DEXTER 1,657,664

SUPPORT AND CONTAINER

Filed Feb. 10, 1927

INVENTOR.
Edwin G. Dexter,
BY Kathleen Duggan
ATTORNEY.

Patented Jan. 31, 1928.

1,657,664

UNITED STATES PATENT OFFICE.

EDWIN G. DEXTER, OF WASHINGTON, DISTRICT OF COLUMBIA.

SUPPORT AND CONTAINER.

Application filed February 10, 1927. Serial No. 167,228.

My present invention pertains to beverage or liquid containers as well as the support therefor, and it contemplates the provision of a device that is adapted to be produced from the shell of the ordinary well known cocoanut, and this in an extremely inexpensive manner and without the employment of expensive tools or machinery.

The invention further contemplates the provision of a device of the character set forth that is also adapted for various purposes other than as a beverage container and support therefor; such, for instance, as a vase, and the like, and this for the reason that the device may be highly ornamented with symbols, designs and markings that will greatly add to the finished appearance of the article produced.

Other advantages and further characteristics of this invention will be fully understood from the following description and claim when the same are read in connection with the drawings accompanying and forming part of this specification, in which:

Similar numerals of reference designate corresponding parts in all of the views of the drawings.

Figure 1:
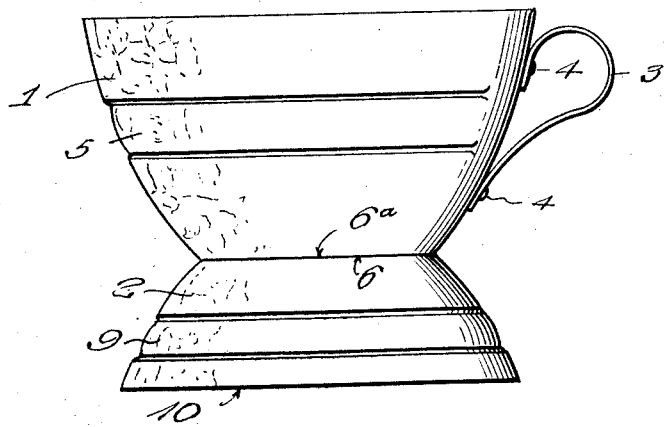
Figure 1 is a side elevation of a container and support therefor and showing the device as formed into a cup and stand.

For the purposes of illustration, I show a cup 1, and a support therefor indicated by 2, and it is to be understood that the said elements are to be produced from the shell of a cocoanut and may be of any shape, as well as configuration as desired.

On the container 1, I provide a handle 3 that is riveted or otherwise secured to the container by means of the fastening devices 4.

On the container I further provide ornamental beading 5 while on the support this beading is indicated by 9, and it is to be distinctly understood that I do not wish to confine myself to any particular form or character of beading as in the future practise of the invention any form of ornamental design may be employed as fairly falls within the scope of the appended claim.

Near the lower end of the container I form a groove 8 that is adapted to engage the upper surface of the support.

Figure 2:
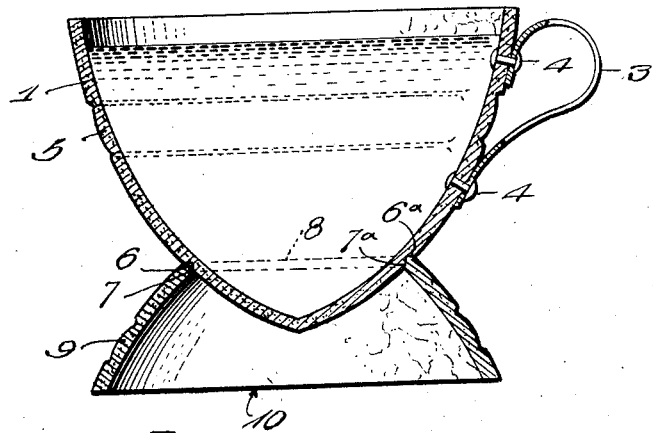
Figure 2 is a longitudinal sectional view of the device.
Figure 3:
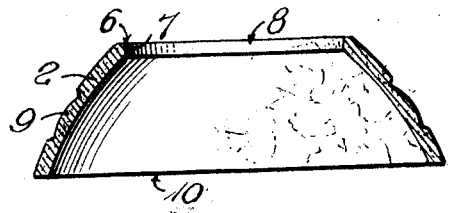
Figure 3 is a view similar to Figure 2 but showing the support alone.

The said upper surface of the support comprises a shoulder 6 that produces the coacting surfaces $6^a$ and $7^a$, as clearly shown in Figure 2.

It will be manifest that the construction of the support 6 in the manner illustrated will tend to retain the container in an upright manner on the support regardless of the contents of said container.

At its lower end the support is formed with the flat surface 10 upon which the support rests.

I would further have it understood that the surface of the finished device may be highly polished in order to embellish the appearance thereof and that any forms, characters, symbols or ornamentations may be used thereon as may suggest themselves in the future practise of the invention.

I claim:

A container consisting of an integral major portion of a cocoanut shell cut transversely therethrough to form a liquid receiving vessel, the said vessel having a peripheral groove spaced from the lower end thereof, and an integral open ended base for the said vessel fabricated of the upper portion of the said shell having the upper edge thereof fitted in said groove.

In testimony whereof, I have hereunto set my hand.

EDWIN G. DEXTER.